March 10, 1925.
E. LIHOTZKY
BINOCULAR MICROSCOPE
Filed March 4, 1924
1,528,931
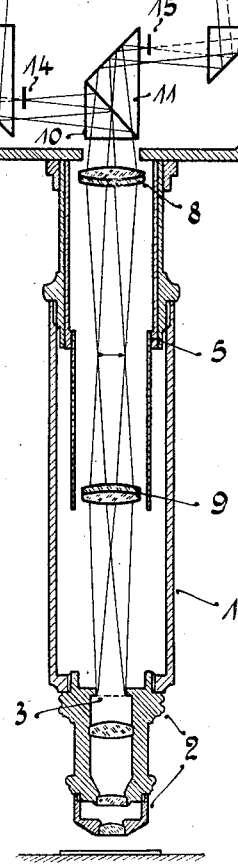
Fig. 1.
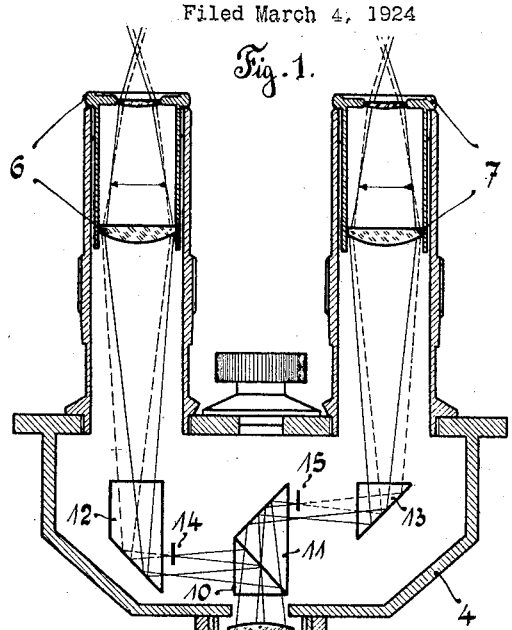
Fig. 2.
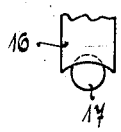
Fig. 3.
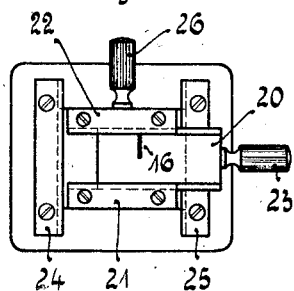
Witness:
Fritz Engelmann
Inventor:
Erwin Lihotzky Patented Mar. 10, 1925.

1,528,931

UNITED STATES PATENT OFFICE.

ERWIN LIHOTZKY, OF WETZLAR, GERMANY, ASSIGNOR TO THE FIRM: ERNST LEITZ, OPTISCHE WERKE, OF WETZLAR, GERMANY.

BINOCULAR MICROSCOPE.

Application filed March 4, 1924. Serial No. 696,905.

*To all whom it may concern:*

Be it known that I, ERWIN LIHOTZKY, a citizen of Austria, residing at Wetzlar, Germany, have invented Improvements in Binocular Microscopes (for which application has been filed in Germany, November 4, 1922), of which the following is a specification.

My invention relates to microscopes and more particularly to binocular miscroscopes adapted for use of only one image-forming objective at a time, as generally employed in monocular microscopes, and with a device for dividing each light ray in two parts after its issue from the objective. By means of a suitable reflecting system the two pencils of light rays are conducted to both eyepieces. Between the objective and both eyepieces a lens system is placed for producing in both eyepieces an image of the viewed object in approximately the same size as it would be obtained by using the objective alone in an ordinary monocular microscope.

The object of the invention is generally to provide an optical arrangement that, on the one hand, should offer the advantages of stereoscopic effect under any circumstances, and that, on the other hand, should also be available without any disadvantages in such cases where the stereoscopic effect is not required.

A further object of the invention is the combination of the said lens system inserted between the objective and both eyepieces and so constructed that it produces at the same time, behind the said device for dividing the light rays, two real images of the exit-pupil of the image-forming objective: with a diaphragm inserted at the place of one or both of these images. The latter should be of such a size that even with a small illuminating aperture it is practically possible to place a diaphragm of suitable form in order to cut off certain portions of light pencils and to obtain thus a stereoscopic effect. The diaphragms may be fixed or movable, so that they can be put out of action, when the stereoscopic effect is not desired.

By setting the diaphragm in only one image of the exit-pupil the stereoscopic effect is obtained without impairing the resolving power of the microscope, the full aperture of its objective being utilized for one eye. By employment of two diaphragms, they are placed in such a manner that that portion diaphragmed of the one image is by the other image able to let the light rays pass.

When several objectives are employed which are interchangeable against each other it is necessary to maintain the coincidence of diaphragm and pupil-image. This can, however, be accomplished by accordingly adjusting in axial direction the said lens system, or a part of it. Further it is quite possible to adjust the diaphragms in axial direction.

The improvements and combinations of elements as herein set forth and particularly pointed out in the appended claims may be embodied in a binocular microscope as a whole or in a special tube attachment to be combined with any ordinary (monocular) microscope where it takes the place of the usual eyepiece.

With these general statements of the objects of the invention I will now proceed to describe one embodiment thereof and the manner in which the invention may be carried out. It will be understood that while I have described what may be considered as a preferable embodiment of the invention, I do not limit myself to the precise constructions herein set forth, as they may be varied by those skilled in the art in accordance with the particular purposes for which they are intended, and the conditions under which they are to be utilized.

In the accompanying drawing Figure 1 is a section of an improved binocular microscope, Figure 2 is an elevation of a diaphragm, and Figure 3 is an elevation of the mounting of a diaphragm.

Like characters of reference throughout the several figures of the drawing indicate like parts.

Referring to Figure 1, which represents an ordinary compound microscope that has been converted into binocular microscope in accordance with the invention, 1 represents a tube of a microscope at the lower end of which is mounted an objective 2. The exit-pupil of this objective 2 is marked 3. On the other end of the tube 1 a tube head attachment is fitted, composed of a tube 5, a a box 4 and a pair of eyepieces 6 and 7. The tube 5 is provided with a cemented lens 8 at the upper end and a cemented lens 9 at the lower end. In the box 4, above the lens 8 a compound cemented prism 10, 11 is situated having a transparent silvering on one of the inner cemented faces, so that a portion of the light ray will be transmitted through the film of silver, whilst the other portion is reflected aside in a horizontal direction. The transmitted light rays are deflected horizontally to the other side by reflection at the upper face of the prism 11. The two horizontal pencils of rays so obtained are directed into the eyepieces 6 and 7 by a prism 12 and 13 on either side. Between the prisms 10 and 12 a diaphragm 14 is inserted, and between the prisms 11 and 13 a diaphragm 15, both of the form as shown in Figure 2.

By means of the objective 2 and the lens system 9 an inverted image of an object is produced which is being erected by means of the lens system 8. At the same time the two lens systems 8 and 9 together reproduce two images of the exit-pupil in the planes of the diaphragms 14 and 15.

To facilitate an understanding of the action of the diaphragms the two extreme pencils of rays proceeding from the exit-pupil 3 are indicated in Figure 1 by full lines and the pencils of rays cut off by the diaphragms by dotted lines. It will be seen that the images in both eyepieces are formed by different pencils of rays and that therefore a very effective stereoscopic vision is obtained.

In Figure 2 a form of the diaphragms 14 or 15 is shown consisting of a thin plate 16 with a concave shape. The circle 17 represents the image of the exit-pupil of the objective 2, whereby the dotted lines indicate the portion cut off by the diaphragm.

Referring to Figure 3 the plate 16 is disposed in a slide 20 adjustable in guides 21, 22, in horizontal direction, e. g. in direction of the optical axis, by means of a handle 23. The slide 20 together with the guides 21, 22 is movable on this part in guides 24, 25 in a vertical direction by means of a handle 26. It is readily seen that in such a way both diaphragms 14 and 15 may be adjusted in every respect.

Having thus described my invention, what I claim and desire to secure by Letters Patent is:

1. In a binocular microscope with a device for dividing each light ray in two parts after its issue from the objective, in combination a lens system of suitable focal length arranged between the objective and the dividing device and so related thereto that an image of the object is produced in both eyepieces, and that at the same time two real images of sufficient size of the exit-pupil of the objective are produced behind the said device for dividing the light rays, and a diaphragm of suitable form located in the plane of one of both images of the exit-pupil of the objective.

2. In a binocular microscope with a device for dividing each light ray in two parts after its issue from the objective, in combination a lens system of suitable focal length arranged between the objective and the dividing device and so related thereto that an image of the object is produced in both eyepieces, the size of these images being approximately the same as it would be produced by using the objective alone, and that at the same time two real images of sufficient size of the exit-pupil of the objective are produced behind the said device for dividing the light rays, and a diaphragm of suitable form located in the plane of one of both images of the exit-pupil of the objective.

3. In a binocular microscope with a device for dividing each light ray in two parts after its issue from the objective, in combination a lens system composed of two separate lenses of suitable focal length arranged between the objective and the dividing device and so related that an image of the object is produced in both eyepieces and that at the same time two real images of sufficient size of the exit pupil of the objectives are produced behind the said device for dividing the light rays, a diaphragm of suitable form located in the plane of one of both images of the exit-pupil of the objective, and means for pushing the diaphragm into and out of the path of rays.

4. In a binocular microscope with a device for dividing each light ray in two parts after its issue from the objective, in combination a lens system composed of two separate lenses of suitable focal length arranged between the objective and the dividing device and so related that an image of the object is produced in both eyepieces and that at the same time two real images of sufficient size of the exit-pupil of the objective are produced behind the said device for dividing the light rays, a diaphragm of suitable form located in the plane of one of both images of the exit-pupil of the objective, means for pushing the diaphragm into and out of the path of rays, and means for adjusting the diaphragm in axial direction.

5. In a binocular microscope with a device for dividing each light ray in two parts after its issue from the objective, in combination a lens system composed of two separate lenses of suitable focal length arranged between the objective and the dividing device and so related that an image of the object is produced in both eyepieces and that at the same time two real images of sufficient size of the exit-pupil of the objective are produced behind the said device for dividing the light rays, two diaphragms of suitable form located in the planes of both images of the exit-pupil of the objective, means for pushing the diaphragms into and out of the path of rays, and means for adjusting the diaphragms in axial direction.

6. Binocular tube attachment for an ordinary microscope with a device for dividing each light ray in two parts its issue from the objective, in combination a lens system composed of two separate lenses of suitable focal length arranged between the objective and the dividing device and so related that an image of the object is produced in both eyepieces and that at the same time two real images of sufficient size of the exit-pupil of the objective are produced behind the said device for dividing the light rays, a diaphragm of suitable form located in the plane of one of both images of the exit-pupil of the objective, means for pushing the diaphragm into and out of the path of rays, and means for adjusting the diaphragm in axial direction.

In testimony whereof I have signed my name to this specification.

ERWIN LIHOTZKY.

In the presence of:
IAME GIUSTI,
C. C. L. B. WYLES.